United States Patent [19]

Boxenhorn et al.

[11] 4,306,691

[45] Dec. 22, 1981

[54] STELLAR CORRECTOR

[75] Inventors: Burton Boxenhorn, Chestnut Hill; Brock S. Dew, Watertown, both of Mass.

[73] Assignee: The United States of America as represented by the Secretary of the Navy, Washington, D.C.

[21] Appl. No.: 18,386

[22] Filed: Feb. 27, 1970

[51] Int. Cl.³ .............................................. F41G 7/00
[52] U.S. Cl. .................................. 244/3.18; 250/203 R
[58] Field of Search ................... 244/3.18; 235/150.6; 250/203

[56] References Cited

U.S. PATENT DOCUMENTS

| | | | |
|---|---|---|---|
| 2,961,191 | 11/1960 | Jasperson | 244/3.18 |
| 3,048,352 | 8/1962 | Hansen | 244/3.18 |
| 3,053,984 | 9/1962 | Hulet | 244/3.18 |
| 3,319,052 | 5/1967 | Arshal | 235/150.26 |
| 3,320,423 | 5/1967 | Blitzer et al. | 250/203 |
| 3,448,272 | 6/1969 | Slater | 250/203 X |

Primary Examiner—Charles T. Jordan
Attorney, Agent, or Firm—R. S. Sciascia; P. C. Lall; A. P. Durigon

[57] ABSTRACT

The present invention concerns using star sightings to supplement the inertial instruments in nonfixed launch systems so as to provide increased accuracy without refinement of the inertial systems. It is particularly applicable to a system in which the missile is launched from a moving base of uncertain position. A stellar fix is obtained by pointing a sensor in the direction of a star, scanning the optical field of view through an elongated slit which is parallel to the pitch axis and centered along the missile roll axis, rotating the missile 90° to interchange the pitch and roll axes and scanning again to establish another coordinate on the first star sighted and a single coordinate on a second star.

5 Claims, 9 Drawing Figures

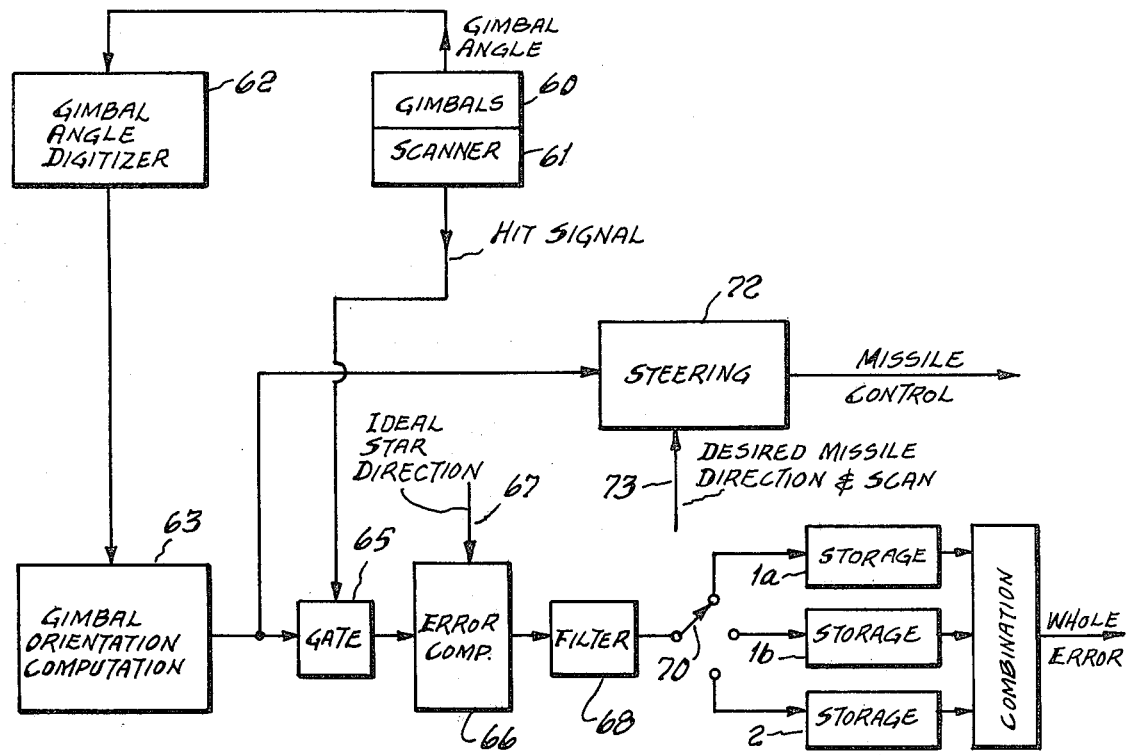
Fig. 7
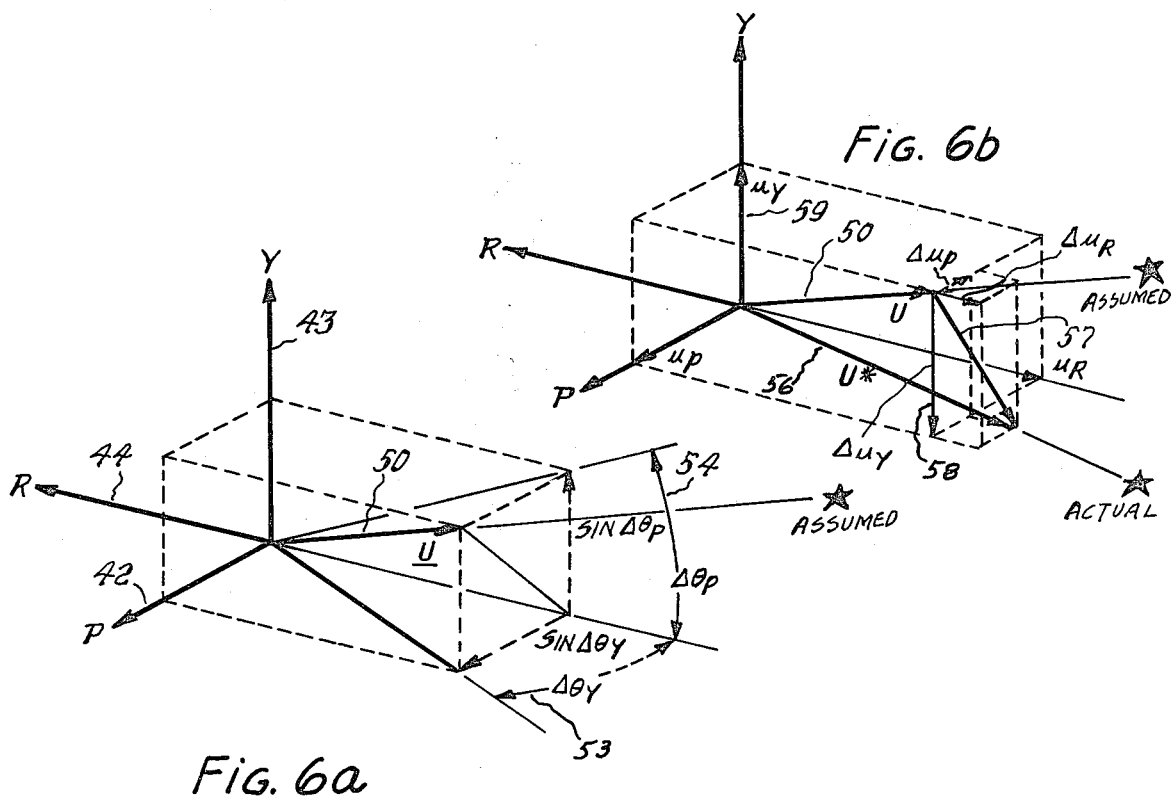
Fig. 6b
Fig. 6a

STELLAR CORRECTOR

The invention described herein may be manufactured and used by or for the Government of the United States of America for governmental purposes without the payment of any royalties thereon or therefor.

The present invention concerns missile guidance methods and means and, more particularly, the augmentation and updating of existing missile guidance methods and means during missile flight.

In the field of missile guidance, efforts are continually being made to improve the accuracy of missile flight so as to reduce the estimated area of impact as much as possible. Where a missile carries an inertial guidance system which includes a guidance computer, it is possible, through the addition primarily of a sensor mounted on the missile case, to acquire and use stellar information obtained in the bus or coasting phase of the missile mission to provide a reduced area of circular probable error (CEP). The present invention concerns a method of and means for achieving such a result.

The invention initially requires selecting a wide field of view having two stars of outstanding brightness therein and using the missile itself as the vehicle for providing cross scanning of the field of view through a single aperture aligned with a single sensor. The guidance computer in the missile is used to provide the gimbal angles which are required to point the vehicle at the primary star. Since the missile navigation system knows the missile's position within a few minutes of arc of the primary and secondary stars at a given point in the trajectory, any anticipated error is so small that it may be considered as a vector. Using an existing resolver chain in the gimbals, the angle vectors are transformed into case coordinates and necessary corrections are made to the guidance equations.

Accordingly, it is an object of the present invention to provide means for supplementing by star sightings the inertial guidance of a missile using angular errors as angle vectors.

It is another object of the present invention to correct a missile's position during the bus phase by star angles obtained by sweeps which are produced through missile rotation.

A further object of the invention is to provide means for correcting the flight of a missile by the use of star sightings wherein the missile itself is rotated to obtain cross bearings on one or two stars.

Other objects, advantages and novel features of the invention will become apparent from the following detailed description of the invention when considered in conjunction with the accompanying drawings wherein:

FIGS. 6a and 6b are schematic diagrams illustrating stellar sensor orientation with respect to the missile coordinates;

FIG. 7 is a block diagram illustrating the missile guidance and correction system.

Figure 1:
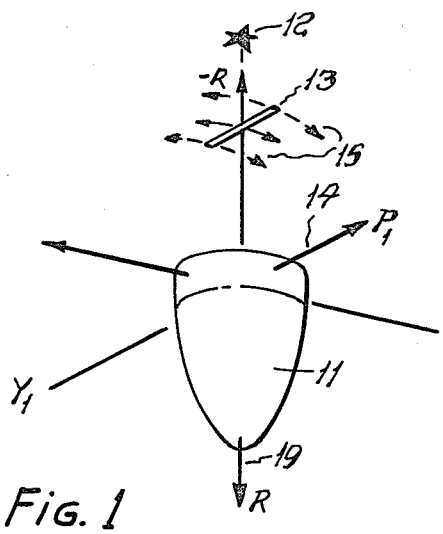
FIG. 1 is a schematic diagram illustrating the scanning maneuvers used in obtaining star coordinates.
Figure 2:
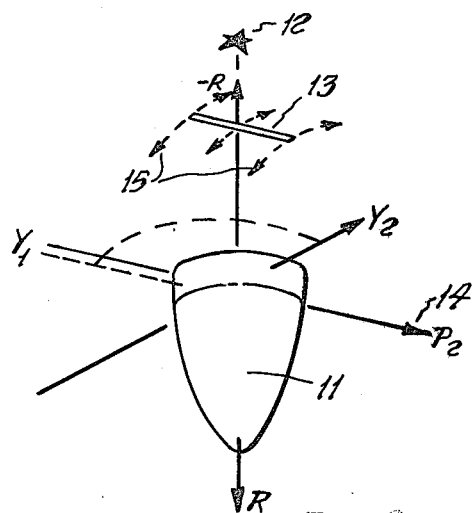
FIG. 2 is a schematic diagram of a scanning maneuver similar to that in FIG. 1 with the missile rotated 90° to provide transverse scanning.
Figure 3:
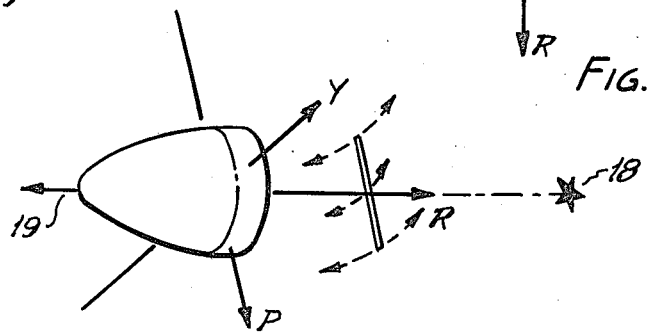
FIG. 3 is another schematic diagram of the scanning maneuver illustrating how a second star may be acquired.

Referring to FIG. 1, a missile 11 is shown in flight at the bus or coasting phase where the required forward thrust is necessary only for minor corrections. The missile, such as a Poseidon missile, includes an inertial guidance system having a gimbaled platform and a computer for directing the missile along a desired trajectory. The missile is adapted to be rotated about its longitudinal axis 360°, this and other maneuvers being controlled by an onboard computer. The foregoing components in the missile are utilized in the present invention to provide a basis for comparing the missile's position with respect to selected stars at selected points along its trajectory. The missile's maneuverability and its computer assist in the comparison by permitting scanning of selected portions of the sky; first, to locate a star; second, to determine the angular relation of that star with respect to the stable platform in the missile; and, third, to compute the error between the predicted bearing of a star or stars at a given instant and the actual bearing of the star or stars. Missile 11 is provided with a sensor, such as is shown in detail in FIG. 4, for sighting a star 12 through an elongated slit 13. With the missile estimated position at any time available in the computer, a star is preselected which may easily be acquired at a selected time by a sensing system directed rearward from the missile. The sensing system is actuated prior to the selected point in flight and the missile at this time is caused to oscillate about its pitch axis 14, as indicated by arrows 15, until star 12 is acquired and its bearing noted. With one coordinate of the star obtained, the missile is then rotated 90° as shown in FIG. 2 so that the yaw axis is aligned as the pitch axis was in FIG. 1. This rotation turns slit 13 90° and makes possible a transverse scanning of star 12 so that a second coordinate of the star may be obtained again by oscillating the missile about the pitch axis. If necessary, a second star 18 in the field of view of the sensor may be preselected and may also be acquired by additional scanning in the oscillation described in relation to FIG. 2; however, only one coordinate of star 18 preferably is obtained. It is noted that in each of these maneuvers the missile is maintained along its trajectory so that its flight is not disturbed during the scanning maneuvers. In summary, FIGS. 1, 2 and 3 show the missile first pointed along substantially the reverse bearing of a star and then oscillated about its pitch axis until the star is sighted. This provides one component of the stellar position. The missile is then rotated 90° about the roll axis, which rotation interchanges the position of the yaw and pitch axes. Scanning in the second position provides the second component of the star position. A third scan in a third position provides one component of the position of a second star.

Figure 4:
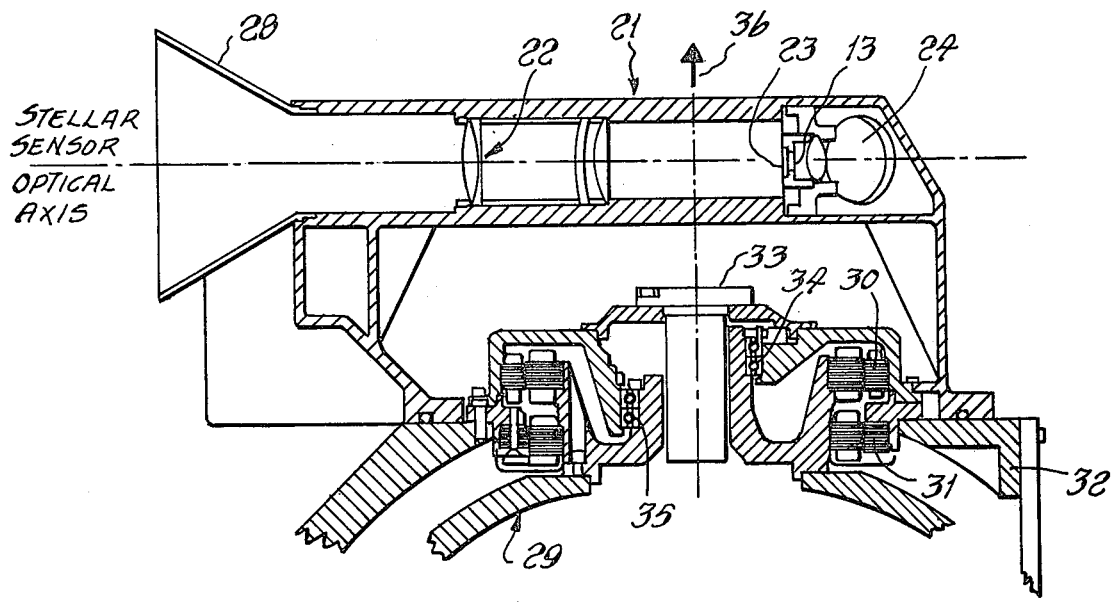
FIG. 4 is a schematic diagram of the sensor employed in one embodiment of the invention.

FIG. 4 illustrates one embodiment of a stellar sensor which may be used in the invention and which includes a conventional telescope 21 having a focusing lens assembly 22 and a slit 13 in a shutter 23 positioned in the focal plane of the telescope. Light passing through slit 13 is redirected by a mirror 24 to a photomultiplier tube, not shown, which is secured to the sensor. The photomultiplier tube has a cathode area disposed in the line of light reflected by mirror 23. A solar impingement shield, not shown, and a light shield 28 are provided to exclude unwanted radiation. The sensor is shown mounted on the outer gimbal assembly 29 of a gyrostabilized platform, not shown. Elements of the outer gimbaled assembly shown are the precision resolver 30 and the torque motor 31. The case of the gimbaled system is indicated at 32. A slip ring 33 and bearings 34 and 35 permit free movement of the outer gimbal assembly with respect to the stable platform. In most cases, gyrostabilized platforms are mounted inside of a missile or other vehicle; and, therefore, an opening, not shown, must be made in the missile casing in line with the axis of focusing lens 22 to permit stars and other objects to be sighted by the apparatus.

Figure 5:
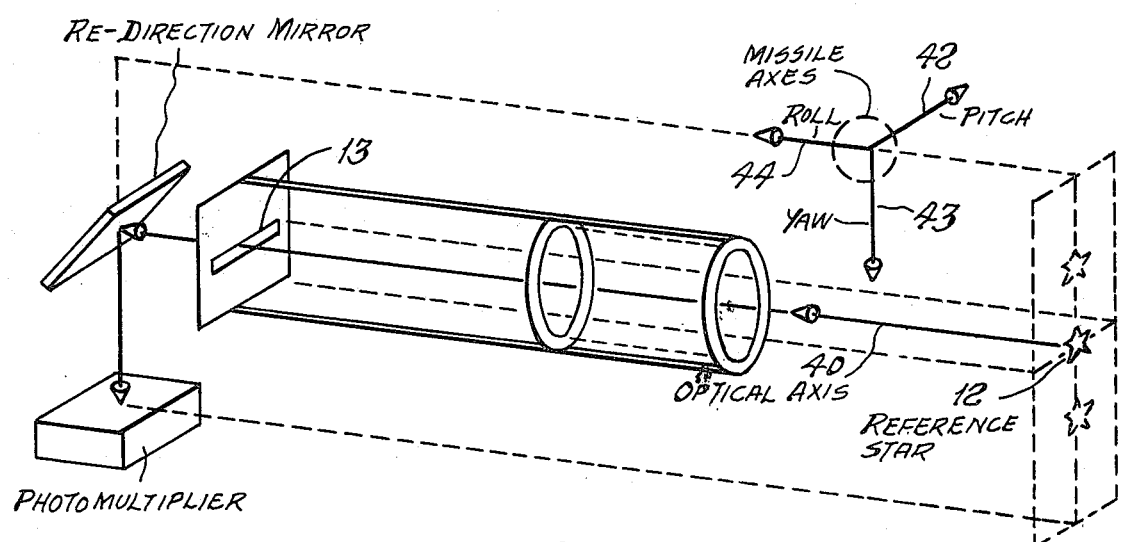
FIG. 5 is a schematic diagram illustrating the manner in which the stellar sensor is mounted on the missile outer gimbal assembly.

FIG. 5 shows the sensor in relation to both the reference star 12, the optical axis 40 of the sensor, slit 13 and the missile roll, pitch and yaw axes 44, 42 and 43, respectively. The sensor 21 is mounted directly on the outer gimbaled resolver housing which is fixed to the case so that rotations in the direction of the roll, pitch and yaw axes of the missile will be imparted to the sensor. The stellar sensor is substantially insensitive to case flexure of the missile since any rotation about the yaw axis will merely slide the star along the slit so that it will have an only second order effect on the pitch angle readout. Similarly, any rotation about the roll axis will have a second order effect on the pitch angle readout. Thus, the effect of flexure or any other disturbance about the roll and yaw axes may be overlooked, making the pitch axis the only critical axis. Since any errors in pitch are direct errors, precision resolver 30 is used as a pitch resolver for angle readout. Any case flexure around the pitch axis thus will be picked up by the pitch resolver, making it possible to input angular variation directly as an error vector in the computer.

FIGS. 6a and 6b present a more detailed picture of the stellar corrector scheme of the present invention, showing a geometric interpretation of star acquisition. FIG. 6a illustrates the case coordinate axes 42, 43 and 44 and a vector 50 which is a direction vector of unit magnitude and points to the prestored star direction. The vehicle steering system is used to align the negative roll axis 44 with this direction vector, that is, attempting to point the rear of the vehicle in this particular direction. The yaw and pitch components of the angular vector 50, as rotations, for small angles are indicated by arrows 53 and 54, respectively. In FIG. 6b, a second vector has been added indicating where the star is seen by the sensor. Due to the position of slit 13, vector 56 must always lie in the roll-pitch plane of the sensor. The difference vector then is indicated at 57 and is the vector which must be added to vector 50 to equal vector 56 so that vector 57 may be considered the correction vector. The yaw component of vector 57 is indicated at 58 and is identical to the yaw component 59 for vector 50 except that it is opposite in sign. Vector 58 is essentially equal to vector 54 or the pitch error vector which is transmitted to the computer when the star is sighted. Since the component of vector 50 along the roll axis is negligible, the system is reduced to reading and transmitting to the computer only one component of a single vector, 50. It can be shown that the error in treating angles as vectors in coordinate transformation is about two seconds or arc, rms, for angular perturbations under a degree which is well within the desired accuracy of the system, i.e. four seconds of arc system error at $\pm \frac{1}{4}°$. These error limits are easily met by an autopilot system capable of holding a vehicle within five minutes of arc system capable of holding a vehicle within five minute of arc such as is the case with the Poseidon autopilot.

The block diagram of FIG. 7 shows the controls for determining star error angle and directing the missile according to the indicated error in position. The missile gimbals are indicated at 60 and the sensor-scanner is indicated at 61. Gimbal angles which reflect the position of the stable platform with respect to the missile are continuously fed to a gimbal angle digitizer 62 and from there to a gimbal angle computation means 63. With a continuous flow of gimbal angle information, including angular changes about the pitch axis which occur when slit 13 is being rotated to acquire a star, the occurrence of a star appearing in the slit causes a signal to be generated by the photomultiplier tube, which signal may be termed a "hit signal" and is used to open a gate in gating means 65 to allow gimbal angle information reflecting the precise setting of the various gimbals to pass to an error compensator 66. The information on the exact position of the star acquired having already been stored in the computer, a signal indicating the gimbal readings of this star, if the missile is in the proper part of its trajectory, is also fed to the error compensator. The star information indicated by arrow 67 thus is used to determine the accuracy of the star sighting and the difference between the observed star angle and the computed star angle is then directed to storage units through a filter 68. The storage units store separately information on each star acquisition, a switch 70 being actuated to record and store the information in storage units 1a, 1b and 2 for the first and second sightings of a second star, respectively. The angular errors represented by the stored information in storage units 1a, 1b and 2 are then combined to determine a position fix. From this fix the error between the actual missile position and its assumed position is determined and transmitted to a missile direction control. Gimbal angle information also is continuously fed to a steering control means 72, which means is actuated by positioning error information in the form of a desired missile direction control indicated at 73 to cause the steering means to apply corrective forces to the missile.

Figure 8:
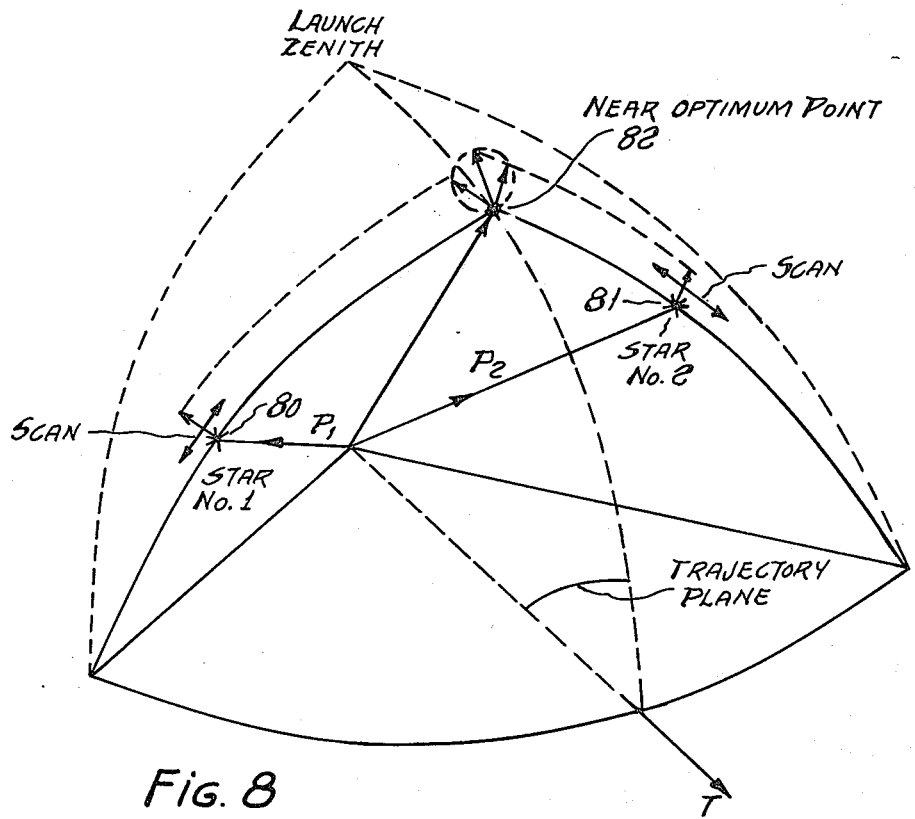
FIG. 8 is a schematic diagram illustrating the use of an optimum point with two half stars.

FIG. 8 illustrates a means by which stellar information on a pseudo star may be used to replace that on two separate stars. The pseudo star system is, in effect, a two half-star mode system wherein single axis measurements on two stars are equivalent to information relative to a point in the trajectory plane of the missile which is determined by information from the spaced stars; that is, if the error information on a star 80, which is identified as star number 1, and the error information on a star 81, which is identified as star number 2, are referred to a common point 82 in the trajectory plane, then the star information may be utilized in the computer as though it referred to a star which is in a position at or near the optimum star point for a given position along the trajectory.

Operation is based on the fact that the missile navigation system knows where it is within a few minutes of arc and, therefore, star positions are known within a few minutes of arc. It is thus possible to compute, before launch, what gimbal angles are required to point the back end, preferably, of the vehicle at the star. That is, computations based on angle differences only are required in contrast to systems where entire angles must be applied to solve trigonometric problems. Star sightings or pseudo star sights are converted into correction signals to redirect the missile through missile control to the target.

What is claimed is:

1. The method of supplementing inertial guidance missiles or other vehicles during selected portions of flights comprising the steps of:

mounting a sensor on the missile with the sensor sighting axis intersecting at right angles the outer gimbal axis of the stable member of the missile inertial guidance system;

acquiring a coordinate of a predetermined star by scanning the optical field of view about the assumed star direction through an elongated slit in the sensor, said scanning accomplished by selected rotation of the missile about one of its three orthogonal axes;

rotating the missile 90° and repeating said scanning step to obtain a second coordinate of said star;

comparing the acquired coordinates with predicted coordinates based on computed missile position; and redirecting said missile to its destination in accordance with the position error information obtained in said scanning steps.

2. The method as defined in claim 1 wherein said missile is rotated additionally to obtain a single coordinate on a second star;

the minutes of arc representing differences in assumed and acquired coordinates being supplied directly as vectors to said computer.

3. A stellar-assisted inertial guidance system for vehicles traversing the atmosphere or space and containing a guidance computer comprising:

optical sensor means attached to said vehicle for detecting and acquiring celestial bodies; said sensor means mounted on the vehicle case and including an elongate, narrow opening for scanning across space and acquiring a selected celestial body; said vehicle rotatable about an axis parallel to said opening to cause scanning movement of said opening;

a detecting means connected to said sensor means and the guidance computer of said vehicle for generating a signal upon acquisition of a celestial body and extracting vehicle position coordinates from said computer at the moment of acquisition of the celestial body, said computer adapted to compare assumed coordinates of said selected celestial body at the time of acquisition with the actual coordinates obtained at the time of acquisition; and vehicle control means connected to said computer and adapted to correct the flight of said vehicle in response to the difference in said assumed and actual coordinates to direct said vehicle to a selected destination.

4. The system of claim 3 wherein said opening is positioned parallel to one of the three orthogonal axes of said vehicle;

said vehicle adapted to be rotated about said one orthogonal axis to cause said opening to sweep across a selected section of space.

5. The system of claim 4 wherein the vehicle inertial guidance system is provided with a stable member, an inner gimbal, a middle gimbal and an outer gimbal;

said sensor means is mounted on said outer gimbal; and the line of sight of said sensor means is perpendicular to the axis of said outer gimbal.

* * * * *